United States Patent [19]

Doerksen et al.

[11] Patent Number: 4,816,802
[45] Date of Patent: Mar. 28, 1989

[54] TIRE PRESSURE MONITORING SYSTEM

[75] Inventors: Ben F. Doerksen, 7037 Laramie La., Corpus Christi, Tex. 78414; Donald M. Nattinger, Corpus Christi, Tex.

[73] Assignee: Ben F. Doerksen, Corpus Christi, Tex.

[21] Appl. No.: 724,779

[22] Filed: Apr. 18, 1985

[51] Int. Cl.4 .................. B60C 23/00; G08B 1/08
[52] U.S. Cl. .................... 340/447; 73/146.8; 340/529; 340/539
[58] Field of Search .............. 340/58, 539, 529; 200/61.25; 116/34 R; 73/146.8; 137/227

[56] References Cited

U.S. PATENT DOCUMENTS

| 2,727,221 | 12/1955 | Sprigg | 340/58 |
|---|---|---|---|
| 2,736,004 | 2/1956 | Greene | 340/58 |
| 3,178,686 | 4/1965 | Mills | 340/58 |
| 3,588,815 | 6/1971 | Koonce | 340/58 |
| 3,654,601 | 4/1972 | Munson et al. | 340/58 |
| 3,660,816 | 5/1972 | Barber | 340/58 |
| 3,697,944 | 10/1972 | Murano | 340/58 |
| 3,796,990 | 3/1974 | Hill | 340/58 |
| 3,803,550 | 4/1974 | Mirsky | 340/58 |
| 3,810,090 | 5/1974 | Davis, Jr. | 340/58 |
| 3,828,309 | 8/1974 | Yamasaki et al. | 340/58 |
| 3,831,141 | 8/1974 | Bowman | 340/661 X |
| 3,879,719 | 4/1975 | Buckley et al. | 340/529 |
| 3,938,077 | 2/1976 | Nakanishi et al. | 340/58 |
| 4,042,816 | 8/1977 | Smodt | 340/61 X |
| 4,137,520 | 1/1979 | Deveau | 340/58 |
| 4,237,728 | 12/1980 | Betts et al. | 340/58 X |
| 4,275,377 | 6/1981 | Matsuda et al. | 340/58 |
| 4,286,253 | 8/1981 | Nagy | 340/58 |
| 4,316,176 | 2/1982 | Gee et al. | 340/58 |
| 4,319,220 | 3/1982 | Pappas | 340/58 |
| 4,468,650 | 8/1984 | Barbee | 340/58 |

Primary Examiner—Glen R. Swann, III
Assistant Examiner—Thomas J. Mullen, Jr.
Attorney, Agent, or Firm—G. Turner Moller

[57] ABSTRACT

A tire pressure monitoring system for a tractor-trailer type vehicle includes a series of sensors on each of the wheels of the vehicle. When a low pressure condition occurs, the sensor activates a radio frequency transmitter for delivering a low power FM signal to a receiver on the tractor. A delay circuit is incorporated in the receiver to require that the signal from the transmitter last for a predetermined duration prior to energizing an indicator in the tractor. The receiver antenna is preferably mounted on the bottom of the tractor in a plane including the trailer wheels.

6 Claims, 4 Drawing Sheets

U.S. Patent  Mar. 28, 1989  Sheet 1 of 4  4,816,802
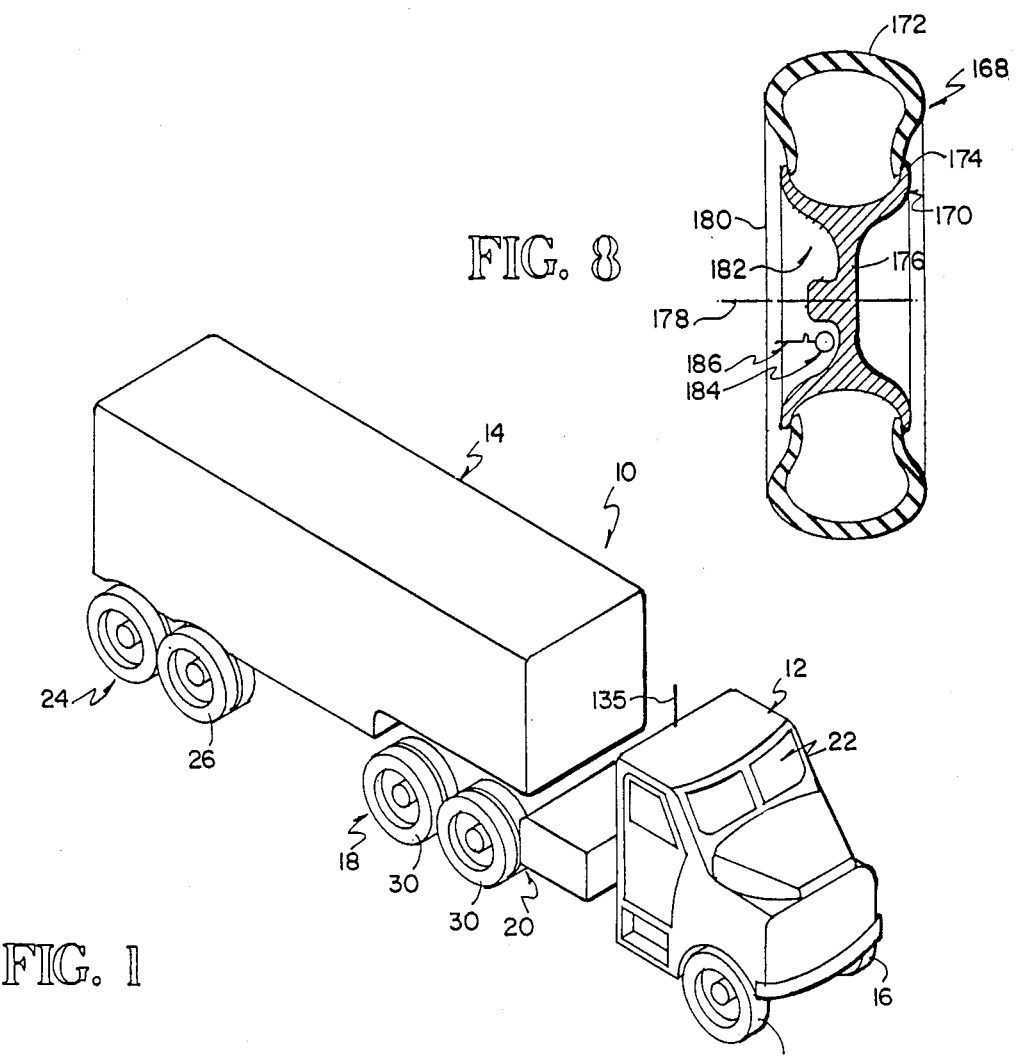
FIG. 8
FIG. 1
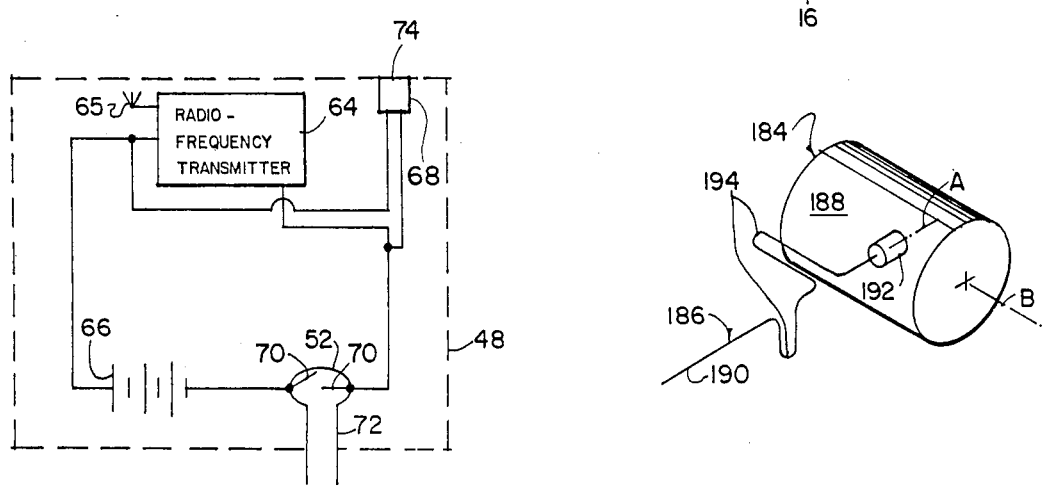
FIG. 4
FIG. 9

TIRE PRESSURE MONITORING SYSTEM

This invention relates to a system for monitoring the pressure in a vehicle tire while the vehicle is moving and energizing an alarm at the operator's station in response to tire pressure below a predetermined value.

This broad concept is not new. Indeed, there are utterly reams of prior art disclosures purporting to provide systems to accomplish this result. An examination of many of these disclosures reveals mechanisms which are wildly impractical, such as those which modify the tire.

One of the first decisions that must be made in designing a tire pressure monitoring system relates to the technique by which the low pressure sensing on one of the rotating wheels is to be relayed to the operator's station. In the device of this invention, a high frequency, low power transmitter is utilized which has a range of about 100 feet and which avoids FCC licensing by user.

An important problem relating to the radio transmissions of low tire pressure signals is that some precautions must be taken to prevent spurious signals from inadvertantly activating the receiver and energizing the alarm. It might be thought that the selection of a peculiar radio frequency would be sufficient. It turns out that this is not the case for a number of reasons. At a selected frequency of 27.14 mHz with the receiver sitting outside in a residential neighborhood within 500 feet of a moderately heavily trafficked business street, a well tuned receiver picked up a surprisingly large number of transmissions at this frequency.

It is applicant's judgement that the real demand for tire pressure monitoring systems lies in over-the-road trucks which habitually travel great distances annually. Many, although not all, of these type trucks tow a trailer which does not necessarily remain with the same tractor at all times. Accordingly, for any system to be acceptable to this market segment, the mechanism carried by the wheels of any trailer must be compatible with the receiver carried by tractors. In addition, it will be evident that greater pains may be taken with those components associated with the operator's station since there is only one operator station while there are normally eighteen wheels which must be monitored. Accordingly, any costs which can be borne by the equipment at the operator's station need be paid for only once while equipment on the wheels must be paid for eighteen times.

Another important feature of a practical tire monitoring system of this type is the ability to manually check tire pressure and to inflate and deflate tires in a fashion which does not impose serious difficulties. Preferably, these functions can be performed in exactly the same manner as on a non-monitored tire.

As it relates to over-the-road trucks, tire pressure monitoring systems which are capable of signaling tire pressure below a predetermined value have significant advantages. First, it has been estimated by knowledgeable persons that one third of the useful life of all tires is lost because of periodic underinflation during the life of the tire. Since over-the-road trucks typically travel in excess of 100,000 miles per year, it is believed that the cost of the monitoring system of this invention may be recouped in one year merely from savings in tire costs. Along this line, tests have been conducted to determine the load distribution in a tire pair when one of the tires is progressively deflated. Common sense indicates that underinflation of one of the tires of a pair will cause a load transfer to the properly inflated tire. When both tires are equally inflated, each tire bears half of the weight imposed on the pair. When one of the tires is completely deflated, all of the weight is necessarily borne by the other tire. The tests confirmed one's common sense conclusions and showed a more-or-less straight line relationship between the underinflation of the test tire and the percentage of load carried by the adjacent tire. With the test tire underinflated by about 50%, about 50% of the load normally carried by that tire was transferred to the properly inflated tire.

Another area of potentially great, but unknown, savings by using properly inflated tires lies in increased fuel efficiency. Common sense indicates that one or more underinflated tires on an eighteen wheel rig should decrease fuel efficiency. The amount of savings that can be expected depend, of course, on the mileage driven, the cost of diesel fuel, the increased efficiency of properly inflated tires and the number of underinflated tires. Although the magnitude of the increased efficiency is not known, it would not be surprising for it to amount to a 5% gain in fuel efficiency. Given the present economics of truck transport, this is not insignificant. It is quite possible for the cost of this invention to be recouped yearly from fuel savings alone. Present indications are that the savings from increased fuel efficiency will be greater than from increased tire life.

Another problem which the prior art has not seemed to address thoroughly are the techniques by which the wheel mounted mechanisms are attached to the wheel. As will be pointed out more fully hereinafter, the techniques of this invention are capable of attachment to conventional truck wheels and/or wheel assemblies. A major advantage of the technique of this invention is that all of the tire pressure monitoring equipment as well as all of the electronics carried by the wheel are mounted in a container attached to the outside face of the wheel rim. By this technique, the device of this invention can be installed on a truck or trailer without removing the tires from the wheel rim which is manifestly an onerous and unnecessary effort.

In the course of development of this invention, a satisfactory prototype was built incorporating a pressure sensor connected to the valve stem of the wheel, a battery and a radio frequency transmitter which delivers a signal when the pressure sensor detects a low pressure condition in the monitored tire. This system worked consistently and reliably. The battery incorporated in this system was a high quality 9-volt alkaline battery. It was thought that this battery would have a life of about two years which is quite satisfactory since the tires of heavily used over-the-road trucks are replaced much more frequently than at two year intervals.

It soon became apparent that conditions on a truck in use bears little relation to test done on a work bench for a variety of reasons. On the work bench, one always has access to fresh batteries, volt meters and the like which determine whether the batteries are performing properly and the like. In contrast, the rule in use is one of neglect. One never knows what voltage the battery is putting out. As surely as the sun rises in the East, there will be many situations where a low voltage condition occurs at a time when the battery is no longer delivering the voltage which is up to specifications. If the device will not deliver an output signal which can be read in the cab, the device will sooner or later lose that confidence of the user that is necessary for commercial success.

A typical tire pressure monitoring system which utilizes a radio transmission link between the tire and the cab is found in U.S. Pat. No. 3,796,990. Other disclosures of tire pressure monitoring systems are found in U.S. Pat. Nos. 2,727,221; 2,736,004; 3,588,815; 3,654,601; 3,660,816; 3,697,944; 3,803,550; 3,828,309; 3,938,077; 4,237,728 and 4,286,253. All of these patents were found in Class 340, Subclass 58 which contains literally reams of devices of this general type.

In summary, this invention comprises a tire pressure monitoring system for detecting the occurrence of a low pressure condition in any one of a plurality of pneumatic tires of a multiwheeled vehicle. The system comprises a pressure switch carried by the wheel of each of the monitored tires. The pressure switch is in pressure communication with the pneumatic tire through suitable hoses and fittings. The pressure switch is in electrical circuit with a battery, a radio frequency transmitter and an indicator carried on the wheel. When the pressure in the pneumatic tire falls below a predetermined value, the pressure switch closes to close the electrical circuit thereby energizing the transmitter and indicator. All of the transmitters broadcast on the same radio frequency.

In the cab of the vehicle there is located a receiver tuned to receive the frequency broadcast by all of the transmitters. When one of the transmitters begins to transmit, the signal is received by the receiver and processed to deliver an output signal from the receiver to an alarm. A delay mechanism is interposed between the receiver output and an indicator located in the vehicle cab. After the signal apperas on the receiver output for a predetermined length of time, the delay mechanism acts to energize the indicator at the operator's station thereby giving an indication of the low pressure condition.

It is an object of this invention to provide a practical tire pressure monitoring system which acts to reliably generate alarm signals at the occurrence of low pressure conditions in one or more tires of a multi-wheeled vehicle.

Another object of this invention is to provide a cost-effective tire pressure monitoring system which may be utilized to detect and signal the onset of a low pressure condition in one or more the vehicle's tires.

Other objects and advantages of this invention will become more fully apparent as this description proceeds, reference being made to the accompanying drawings and appended claims.

IN THE DRAWINGS:

FIG. 1 is an isometric view of a typical eighteen wheel tractor-trailer combination equipped with the tire pressure monitoring system of this invention;

FIG. 4 is a schematic view of the electrical circuit contained in each of the housings affixed to the vehicle tires;

FIG. 8 is an enlarged cross-sectional view of FIG. 7, taken substantially along line 8-8 thereof, as viewed in the direction indicated by the arrows; and, FIG. 9 is an isometric view of the improved housing-antenna.

Figure 2:
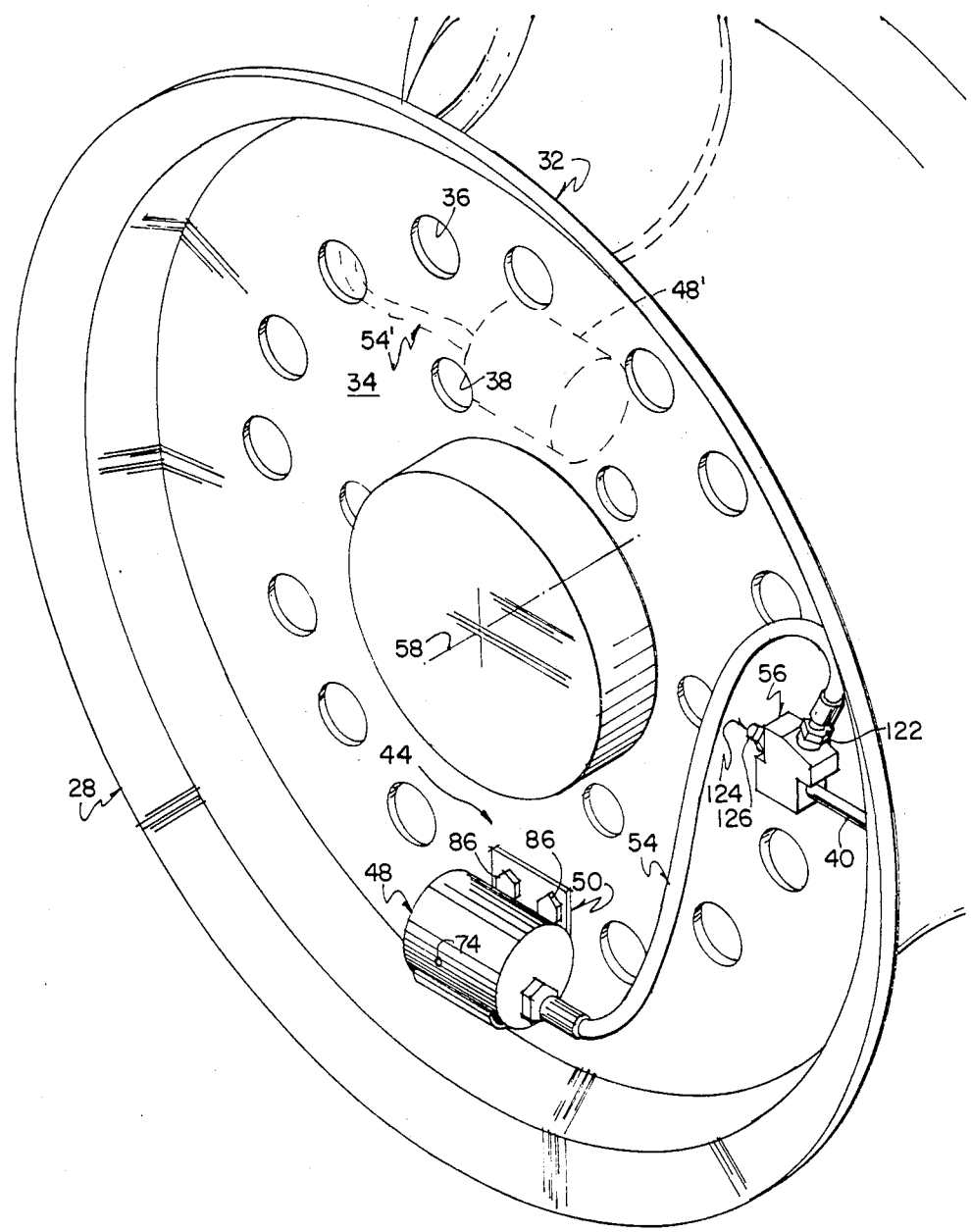
FIG. 2 is an isometric view of a wheel equipped with the sensors of this invention.
Figure 3:
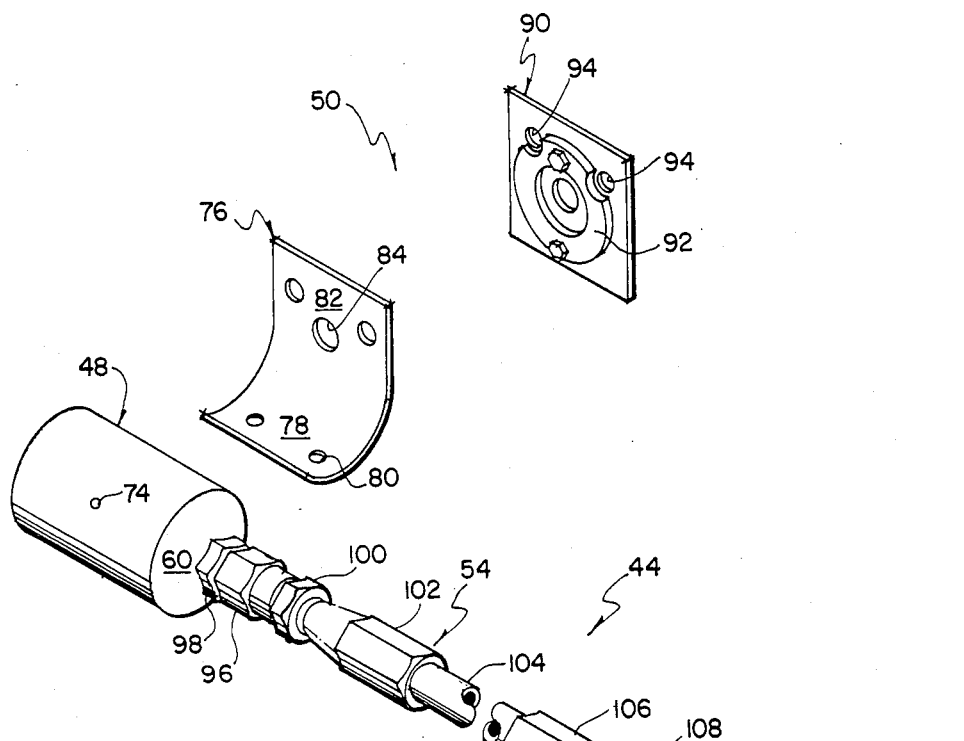
FIG. 3 is an exploded isometric view of the sensor of this invention.
Figure 5:
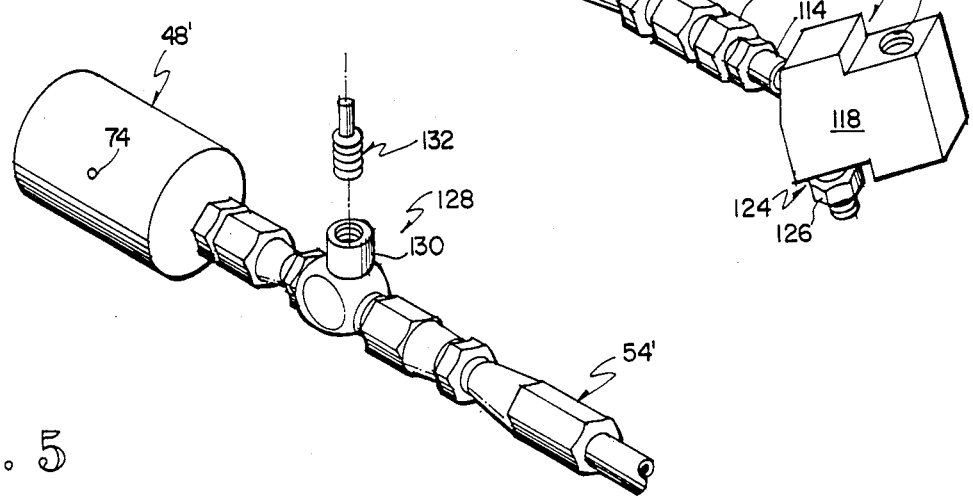
FIG. 5 is an isometric view of a housing and air pressure transmitting conduits, similar to FIG. 3.

Referring to FIGS. 1-3, there is illustrated a conventional multi-wheel vehicle 10 such as a tractor-trailer rig comprising a tractor 12 having a fifth wheel (not shown) for towing a trailer 14. Typically, the tractor 12 includes a pair of steerable front wheel assemblies 16 and a pair of rear or drive axle assemblies 18 each of which mounts two pairs of wheel assemblies 20. The tractor 12 also includes an operator's station 22.

The trailer 14 may be of conventional design comprising a frame (not shown) supporting a pair of axle assemblies 24 each of which carries two pair of trailer wheels 26. As will be more fully pointed out hereinafter, the drive wheel pairs 20 and the trailer wheel pairs 26 may be substantially identical.

The drive wheel assemblies 20 comprise a wheel 28 having a tire 30 supported thereon. Referring to FIG. 2, the wheel 28 is of conventional design having an annular tire receiving section 32 and a central web 34 having a first series of apertures 36 therein which act to reduce the weight of the wheel 28 and a second series of apertures 38 which pass the threaded fasteners used to connect the wheel 28 to its associated hub (not shown) of the axle assembly 18. The pneumatic tire 30 includes a stem 40 extending through an opening in the annular tire receiving section 32. Typically, the stem 40 is interiorly threaded to receive a Schrader valve (not shown) and also includes an exteriorly threaded section (not shown) which typically receives an imperforate cap (not shown) used to prevent dirt or other contaminates from entering the stem 40 and fouling the Schrader valve.

The tire pressure monitoring system of this invention comprises a wheel mounted assembly 44 associated with each of the monitored tires and an assembly 46 located in the operator's station 22 of the tractor 12.

As will be evident to those skilled in the art, the wheel-tire assemblies 20 of the tractor are, for all practical purposes, identical to the wheel-tire assemblies 26 of the trailer 14 in the sense that both comprise an inner wheel and tire and an outer wheel and tire which are both mounted for simultaneous rotation. An important factor to the implementation of this invention is the notion that the inner and outer tires do not rotate relative to one another and, in fact, are mounted on their respective hubs so that they cannot rotate relative to one another.

As shown best in FIGS. 2-4, the wheel mounted assembly 44 of this invention comprises a housing 48 mounted on the central web 34 by a bracket assembly 50. A pressure switch 52 inside the housing 48 connects by a hose-fitting assembly 54 to a fitting 56 connected to the stem 40 of the pneumatic tire 30. As shown best in FIG. 2, one of the housings 48 is connected by the assembly 54 to the valve stem 40 of the outer pneumatic tire 30. Another housing 48', shown in phantom lines, is connected to the wheel 28 at a location 180° spaced from the first housing 48 at the same distance from the axis 58 of rotation of the wheel-tire assembly 20. The second housing 48' is connected by its hose-fitting assembly 54', through one of the apertures 36, to the stem of the inner pneumatic tire. Since the housings 48, 48' are diametrically opposed, it will be seen that their attachment to the wheel 28 does not disturb the balance of the wheel-tire assembly dramatically and can be overcome by the use of very small balancing weights.

The housing 48 may be of any suitable design. Conveniently, the housing 48 comprises a generally cylindrical structure which is injection molded from plastic having an end cap 60 secured in any suitable fashion to the body of the housing 48, as by screwing the end cap 60 into the open end of the housing 48.

As will be more fully apparent hereinafter, the housing 48 has therein a radio frequency transmitter 64 which is tuned to transmit the desired frequency, a battery 66, the pressure switch 52 and an indicator 68. As will be evident, the pressure switch 52 includes a pair of contacts 70 which are normally biased into an open position by tire pressure received through a conduit 72. So long as the contacts 70 are opened, it will be evident that the transmitter 64 and indicator 68 are not energized. As soon as the pressure in the conduit 72 falls below a predetermined value, the contacts 70 close thereby completing the circuit including the battery 66 so that the transmitter 64 and the indicator 68 are energized.

The transmitter 64 may be of any suitable type to transmit any suitable frequency. As a matter of convenience, the frequency selected for the transmitter 64 is 27.14 mHz with a power on the order of 10 milliwatts. This frequency and power level is such that the device of this invention is clear of the present FCCF regulations which require licensing by the user. The transmitter 64 may have an antenna 65 inside the housing 48.

The battery 66 is likewise of any suitable type. Preferably, the battery 66 is of a long lasting variety since it is obviously undesirable to change the battery 66 at frequent intervals. It is presently believed that commercially available state-of-the-art batteries are capable of lives in excess of one year in the environment of the housing 48.

The pressure switch 52 may likewise be of any suitable type. Preferably, the switch 52 is of a quality type in order to minimize malfunctions due to switch failure.

The indicator 68 is preferably of the visual type having an end 74 extending through an opening in the cylindrical wall of the housing 48 so that one can visually determined which of the tires of the truck 10 is experiencing a low pressure condition. Preferably, the opening in the cylindrical wall and the indicator end 74 are located so that they are visible regardless of the rotational position of the wheel 32 relative to its axis 58. To this end, the indicator end 74 is pointed away from the wheel 32, as contrasted to being pointed toward the axis 58. Preferably, the indicator 68 is a light emitting diode. Since all of the transmitters 64 broadcast at the same frequency, the indications provided by the cab mounted assembly 46 indicate only that one of the tires has a low pressure condition. The cab assembly 46 does not designate which of the tires is low. The driver must get out of the vehicle and walk around to look for the indicator 68 which is illuminated. That will tell the driver which of the tires is low.

The mounting bracket 50 is conveniently of two piece construction comprising a first component 76 having a curved lower end 78 providing openings 80 receiving threaded fasteners (not shown) extending into the housing 48. The upper end 82 of the component 76 is conveniently planar providing a plurality of openings 84 receiving threaded fasteners 86 passing through openings drilled through the web 34 of the wheel 28.

The bracket assembly 50 also comprises a second component 90 which is placed behind the web 34 so that the web 34 is captivated between the first and second components 76, 90. The component 90 is conveniently substantially planar having a raised annular portion 92 and having a plurality of openings 94 therethrough for receiving the fasteners 86.

The hose-fitting assembly 54 constitutes a conduit for transmitting tire pressure from the fitting 56 to the conduit 72 leading to the switch 52. To this end, the hose-fitting assembly 54 comprises an interiorly threaded nut 96 threadably received on a nipple 98 carried by the housing 48. The nut 96 connects to a swivel fitting 100 carried on the end of a press-fit fitting 102 connected to a hose 104. The opposite end of the hose 104 carries a similar press-fit fitting 106 connected by a swivel fitting 108 to an interiorly threaded nut 110 receiving an adapter 112 screwed onto a fitting 114 having therein a Schrader valve (not shown). The adapter 112 carries a prong (not shown) opening the Schrader valve when the fitting 114 is screwed into the adapter 112.

The purpose of the fitting 56 is to deliver tire pressure from the tire stem 40 to the hose-fitting assembly 54 while allowing the tire to be inflated or deflated in a conventional manner without disassembling the fitting 54. To these ends, the fitting 56 comprises a block of material 118 having therein a plurality of intersecting air passages leading between an inlet 120, an outlet 122 and a filling opening 124. The inlet 120 preferably comprises an interiorly threaded section for receiving the exteriorly threaded section (not shown) of the tire stem 40. The inlet 120 preferably comprises a feeler to depress the conventional actuator of the Schrader valve located in the stem 40. It will accordingly be seen that screwing the fitting 56 into the valve stem 40 will cause the pressure in the tire 30 to exhaust through the outlet 122 of the fitting 56.

The outlet 122 preferably comprises an interiorly threaded opening receiving the fitting 114 having a Schrader valve (not shown) therein. Similarly, the inflation and deflation opening 124 also includes a fitting 126 having a Schrader valve (not shown) therein. It will accordingly be seen that assembly of the fitting 56 onto the valve stem 40 delivers tire pressure into the passages provided by the fitting 56. Leakage of this pressure is temporarily avoided since the Schrader valves in the fittings 114, 126 prevent it. When the fitting 114 is screwed into the adapter 112, the prong in the adapter 112 opens the Schrader valve thereby delivering tire pressure into the assembly 54 and ultimately into the switch 52.

It will accordingly be seen that the fitting 56 allows the tire 30, which is the outside tire of the pair to be inflated and deflated without disassembling the hose-fitting assembly. Accordingly, inflation and deflation of the outer tire may be accomplished in a more-or-less conventional manner which will present no obstacle to the operator of the truck 10.

In order to allow the inner tire of the pair to be inflated and deflated in a similar manner, the hose-fitting assembly 54' includes a fitting 128 having an upwardly extending interiorly threaded stub conduit 130 receiving a fitting 132 having therein a conventional Schrader valve. It will accordingly be seen that the inner tire of the pair may be inflated through the fitting 132 in a conventional manner without requiring the truck operator to crawl under the vehicle.

As mentioned previously, there is a surprising problem relating to spurious signals which might energize the receiver in the cab assembly 46 which will produce false indications of low pressure conditions in one or more of the monitored wheels. This, of course, is fatal to any acceptance of a tire pressure monitoring system. It was learned that no amount of tuning of the receiver would overcome this difficulty. To overcome this difficulty, the cab assembly 46 of this invention comprises a more-or-less conventional FM receiver 134 having an antenna 135 connected through a delay circuit 136 to a visual indicator 138 and an audio indicator 140.

An FM receiver was chosen because almost all other radios used in the 27 mHz band are amplitude modulated. This will eliminate most interference, as an FM receiver will ignore AM type signals due to the nature of its design.

The receiver 134 is of conventional FM design having an output 142 which, in a conventional radio, would be used to unsquelch the audio circuit to enable the speaker to operate. Instead, the output 142 is connected to the delay circuit 136. The purpose of the delay circuit 136 is to require the presence of a continuous signal on the output 142 for a predetermined length of time before the indicators 138, 140 are energized. The delay afforded by the circuit 136 should be at least on the order of about five seconds and is preferably on the order of about 15-20 seconds. It has been found that a delay of this magnitude substantially eliminates false alarms caused by spurious radio signals.

Figure 6:
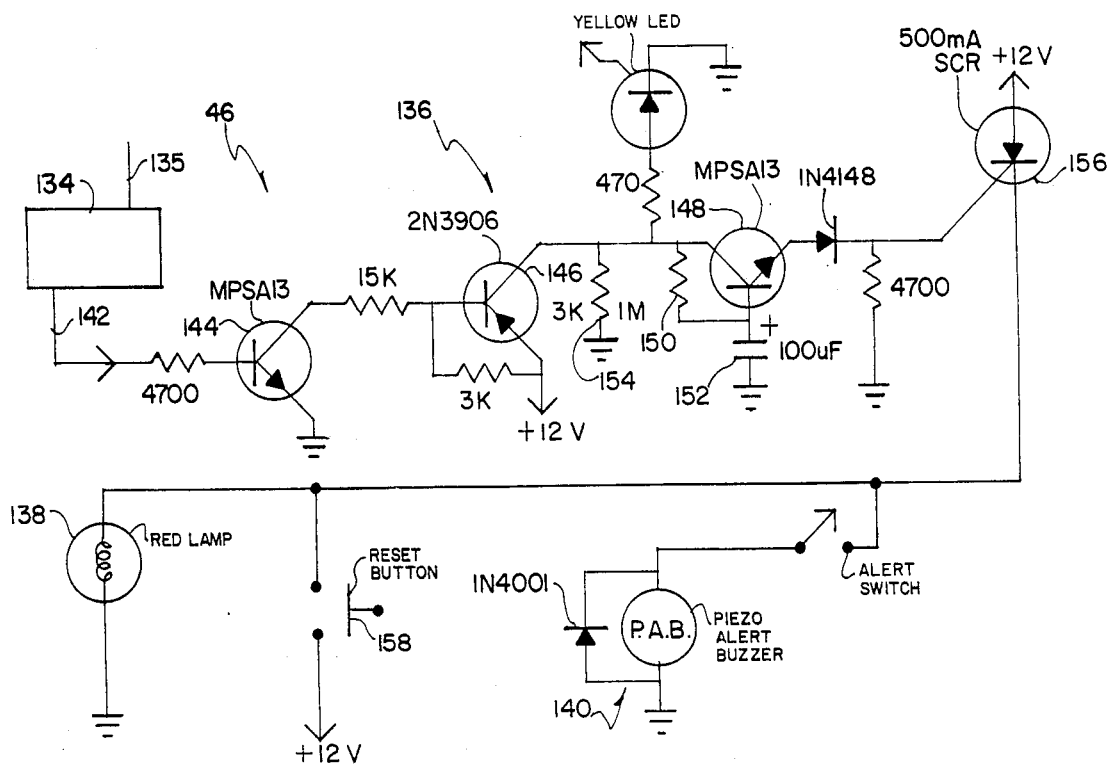
FIG. 6 is a schematic electrical diagram of the delay circuit of this invention.

An embodiment of the delay and latch circuit 136 is depicted schematically in FIG. 6. In this circuit, the output signal from the receiver 134 is passed, via translators 144 and 146 serving to amplify the signal, to the collector of transistor 148 and, across resistor 150, to the base of this transistor. A capacitor 152 is connected between ground and the junction of resistor 150 and the base of transistor 148. It will be seen that, in the presence of the output signal 142, capacitor 152 will charge to a potential sufficient to bias transistor 148 into conduction thereby providing a grating signal to silicon controlled rectifier 156 to energize the indicators 138, 140. The charging time of the capacitor and, accordingly, the delay time of the circuit, is in at least the order of five seconds and, preferably, is approximately twenty seconds. In the event the output signal 142 is of lesser duration, the charge on the capacitor will drain off through the resistors 150, 154 to prevent spurious signals from actuating the indicators 138, 140. However, SCR 156 remains on until deactivated by means of the manual reset button 158.

A tire pressure monitoring system as heretofore described has been constructed and tested. The system has worked satisfactorily and has been consistently reliable. In an attempt to determine the operational limits of the tire pressure monitoring system of this invention, the battery 66, which was a high quality 9 volt alkaline battery, was discharged until it could deliver only 6 volts. This, of course, is one of those things that could readily happen for a wide variety of reasons. It was discovered that the tire pressure monitoring system did not consistently and reliably energize the alarms 138, 140 in the operator station 22 in response to a low pressure condition in one of the vehicle tires. It was shortly realized that adequate radio signals were received at the receiver 134 when the low pressure condition was sensed on the front wheels 16 or the drive wheels 30 of the truck 12. The difficulty involved receiving an adequate signal at the antenna 135 from the trailer wheels 26.

An analysis of the geometry revealed several surprising factors. First, it is widely thought that FM radio broadcasts are received in line-of-sight only. This cannot be the case since any straight line between the location of the transmitter 64 and the antenna 135 necessarily passes through one or more wheels, tires and the trailer body. It is accordingly somewhat surprising that FM radio transmissions are effective at all in this environment.

In order to enable the radio frequency transmitter to operate at substantially depressed voltages, two changes were made. First, the location of the antenna 135 was changed to present a better target to the various wheel mounted transmitters and to minimize the average distance between the wheel mounted transmitters and the receiver antenna. In addition, the antenna of the transmitter was extended out of the housing into a protected location inside the wheel well.

Figure 7:
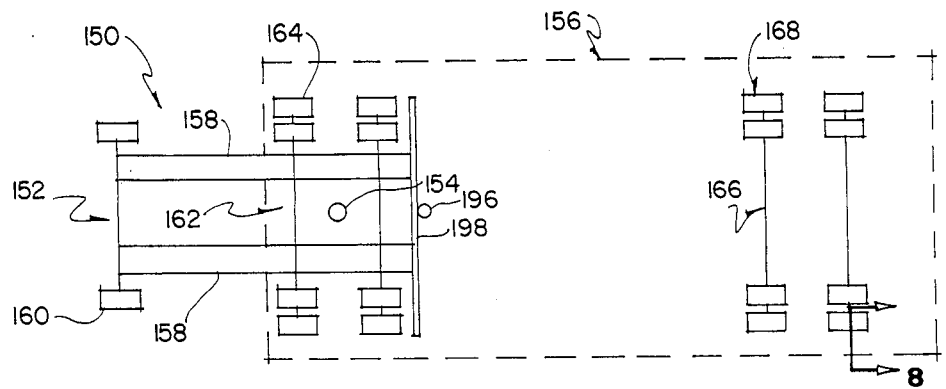
FIG. 7 is a bottom view of a multi-wheel vehicle equipped with an improved tire monitoring system of this invention.

Referring to FIGS. 7-9, there is illustrated a conventional multi-wheeled vehicle 150 such as a tractor-trailer rig comprising a tractor 152 having a fifth wheel 154 for towing a trailer 156. Typically, the tractor 152 includes a pair of longitudinally extending frame members 158, a pair of steerable front wheel assemblies 160 and a pair of rear or drive axle assemblies 162 each of which mounts two pairs of wheel assemblies 164.

The trailer 14 may be of conventional design comprising a frame (not shown) supporting a pair of axle assemblies 166 each of which carries two pair of trailer wheels 168.

Referring to FIG. 8, the trailer wheels 168 comprise a wheel 170 having a tire 172 mounted thereon. The wheel 170 is of conventional design having an annular tire receiving section 174 and a central web 176 which is substantially recess relative to the extremities of the annular tire receiving section 174. The trailer wheel 168 is mounted for rotation about an axis 178. It will accordingly be seen that an imaginary plane 180 defines a wheel well 182 of substantial depth between the plane 180 and the central web 176.

A bracket (not shown) similar to the bracket 50 mounts a housing 184 in the wheel well 182 to the central web 176. The housing 184, as shown in FIG. 9, is substantially identical to the housing 48 except for the provision of a transmitting antenna 186 extending out from the cylindrical wall 188 of the housing 184. As shown best in FIG. 8, the transmitting antenna 186 resides wholly inside the wheel well 182, i.e. that volume located between the imaginary plane 180 defined by the outer extremity of the trailer wheel 68 and the central web 176. It will accordingly be seen that the antenna 186 is protected from damage such as rubbing against a curb.

The antenna 186 preferably comprises a relatively stiff wire 190 connected to a fitting 192 extending through the cylindrical wall 188. The wire 190 preferably has one or more loops 194 therein to make the wire 190 more flexible. The wire 190 is preferably substantially parallel to the wheel axis 178 so that the wire 190 remains at the same angular relationship relative to the truck mounted antenna 196. It will be seen that if the antenna wire 190 were at an appreciable acute angle relative to the axis 178, the angular relationship between the wire 190 and the truck antenna 196 would be continuously changing as the wheel rotates.

Referring back to FIG. 7, the antenna 196 of the FM receiver is shown at its preferred location connected by a bracket (not shown) to a rear frame member 198 of the tractor 152. The antenna 196 extends downwardly from the frame member 198 and terminates about ten inches above ground level. The antenna 196 accordingly lies in the plane of the wheels 160, 164, 168. It will accordingly be seen that the receiver antenna 196 is located underneath the trailer 156 and is accordingly more apt to receive the transmissions from the trailer wheels 168.

Tests run on the time monitoring system in the embodiment of FIGS. 7–9 indicates that signal strength at the receiver is 3–4 times the signal strength of the embodiment of FIGS. 1–6.

Although the invention has been described in its preferred form with a certain degree of particularity, it is understood that the present disclosure of the preferred forms is only by way of example and that numerous changes in the details of operation and in the combination and construction of parts may be resorted to without departing from the spirit and scope of the invention as hereinafter claimed.

I claim:

1. A tire pressure monitoring system comprising
a housing and means in the housing for sensing a low pressure condition in a pneumatic tire supported on a wheel rotatable about its axis, the wheel comprising an annular tire receiving section having a tire therein, a central web and a wheel well defined by a plane perpendicular to the wheel axis abutting the tire and the central web;
a radio-frequency transmitter, in the housing, carried by and rotatable with the wheel, the transmitter being connected to the sensing means and providing an output signal in response to the low pressure condition, the transmitter including an antenna exterior of the housing and extending away from the wheel along an axis generally parallel to the wheel axis, the transmitter antenna being located wholly in the wheel well;
a receiver, carried by the vehicle and having an output, for receiving the output of the transmitter and producing an output signal in response thereto through the receiver output;
an indicator carried by the vehicle for indicating the presence of the low pressure condition; and
means in circuit between the receiver output and the indicator for energizing the indicator upon the appearance of the output signal on the receiver output and the maintenance of the output signal on the receiver output for a predetermined time.

2. In combination, a tire pressure monitoring system and a multi-wheel vehicle comprising a tractor having a pair of steerable front wheels and multiple drive wheels, and a multiple wheel trailer coupled to the tractor, each of the wheels including a pneumatic tire, each of the trailer wheels including an annular tire receiving section having the pneumatic tire thereon, a central web and a wheel well defined by a plane perpendicular to the wheel axis abutting the tire and the central web, the system comprising
means carried by each trailer wheel including a housing having therein means for sensing a low pressure condition in the pneumatic tire thereon and a radio-frequency transmitter connected to the sensing means and providing an output signal in response to the low pressure condition, the transmitter including a transmitting antenna extending out of the housing away from the wheel along an axis generally parallel to the wheel axis, the transmitter antenna being located wholly in the wheel well;
a receiver, carried by the tractor, having an antenna on the tractor for receiving the output signal of the transmitter and producing an output, the receiving antenna being located in a generally horizontal plane intersecting the trailer wheels; and
an indicator carried by the tractor for indicating the presence of the low pressure condition.

3. The tire pressure monitoring system of claim 2 wherein the receiving antenna is positioned adjacent the tractor drive wheels at a location under the trailer.

4. The tire pressure monitoring system of claim 2 wherein the transmitter antenna comprises an elongate metal rod having at least one U-shaped loop therein imparting flexibility to the rod.

5. The tire pressure monitoring system of claim 2 further comprising
first means, for each tractor drive wheel, including a second housing having therein means for sensing a low pressure condition in the pneumatic tire thereon and a radio frequency transmitter connected to the sensing means and providing an output signal in response to the low pressure condition, the transmitter including a transmitting antenna extending out of the housing away from the wheel along an axis generally parallel to the wheel axis.

6. The tire pressure monitoring system of claim 2 wherein the transmitting antenna is generally horizontal and the receiving antenna is generally vertical.

* * * * *